(12) United States Patent
Hall

(10) Patent No.: US 10,791,877 B2
(45) Date of Patent: Oct. 6, 2020

(54) FOOD WASHING ASSEMBLY

(71) Applicant: Yolanda Hall, Dallas, TX (US)

(72) Inventor: Yolanda Hall, Dallas, TX (US)

( * ) Notice: Subject to any disclaimer, the term of this patent is extended or adjusted under 35 U.S.C. 154(b) by 129 days.

(21) Appl. No.: 16/140,702

(22) Filed: Sep. 25, 2018

(65) Prior Publication Data

US 2020/0093332 A1    Mar. 26, 2020

(51) Int. Cl.
*A47J 43/24* (2006.01)

(52) U.S. Cl.
CPC .................................... *A47J 43/24* (2013.01)

(58) Field of Classification Search
None
See application file for complete search history.

(56) References Cited

U.S. PATENT DOCUMENTS

| | | |
|---|---|---|
| 1,844,691 A | 2/1932 | Schneider |
| 1,956,048 A | 4/1934 | Sai |
| 2,100,675 A | 11/1937 | Traynor |
| 2002/0078983 A1* | 6/2002 | Baccini .................. A47J 36/08 |
| | | 134/182 |
| 2006/0078661 A1 | 4/2006 | Wang |
| 2007/0251874 A1* | 11/2007 | Stewart .................. A47J 43/24 |
| | | 210/232 |
| 2008/0173336 A1* | 7/2008 | Rosenblatt ............... B65F 1/14 |
| | | 134/110 |
| 2011/0192427 A1 | 8/2011 | Nelson |
| 2017/0135527 A1 | 5/2017 | Hoye |

* cited by examiner

*Primary Examiner* — Cristi J Tate-Sims

(57) ABSTRACT

A food washing assembly includes a container for containing a fluid and food items. The container has an outer wall and the outer wall has a plurality of deformable sections that is each squeezable inwardly on the outer wall. A strainer is positionable in the container to support the food items. Each of the deformable sections is squeezed to frictionally engage the strainer thereby retaining the strainer at a selected point in the container. Moreover, the container is agitated when the when the strainer is positioned in the container for washing the food items with the fluid. A lid is removably coupled to the container for retaining the food items and the fluid in the container for washing the food items with the fluid.

5 Claims, 3 Drawing Sheets

FOOD WASHING ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to washing devices and more particularly pertains to a new washing device for washing food items in a vehicle.

BRIEF SUMMARY OF THE INVENTION

An embodiment of the disclosure meets the needs presented above by generally comprising a container for containing a fluid and food items. The container has an outer wall and the outer wall has a plurality of deformable sections that is each squeezable inwardly on the outer wall. A strainer is positionable in the container to support the food items. Each of the deformable sections is squeezed to frictionally engage the strainer thereby retaining the strainer at a selected point in the container. Moreover, the container is agitated when the when the strainer is positioned in the container for washing the food items with the fluid. A lid is removably coupled to the container for retaining the food items and the fluid in the container for washing the food items with the fluid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
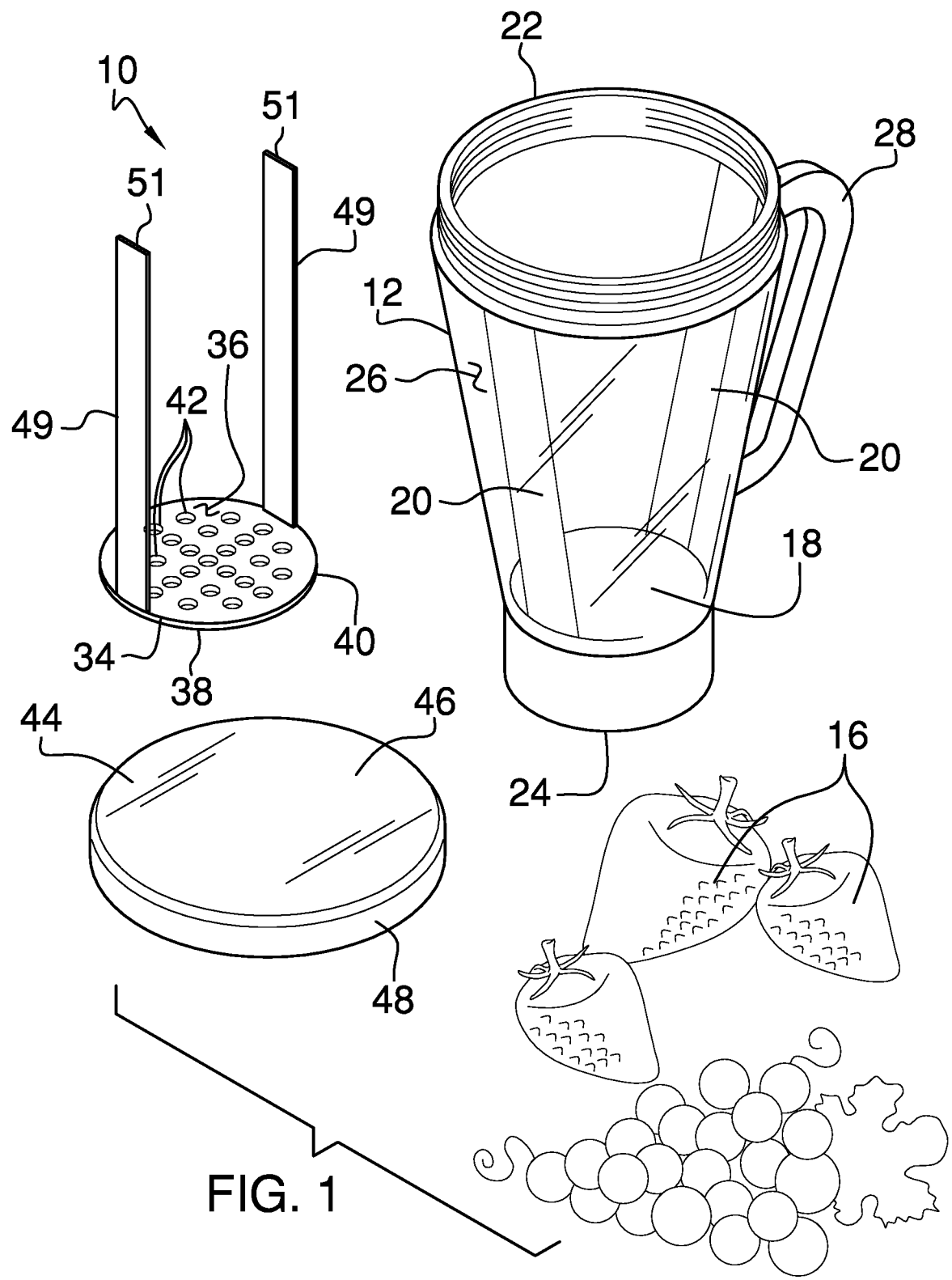
FIG. 1 is a perspective view of a food washing assembly according to an embodiment of the disclosure.
Figure 2:
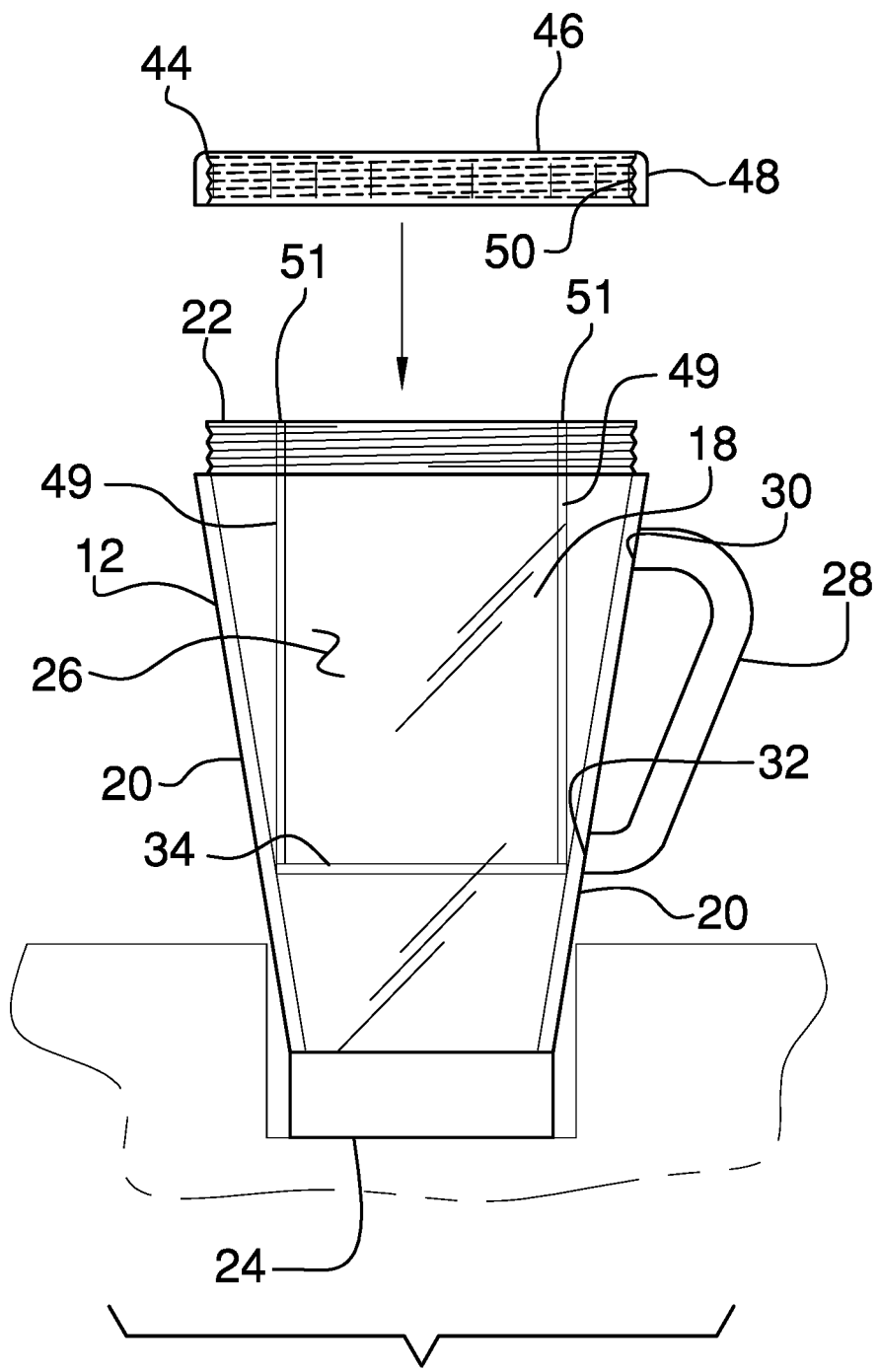
FIG. 2 is an exploded perspective view of an embodiment of the disclosure.
Figure 3:
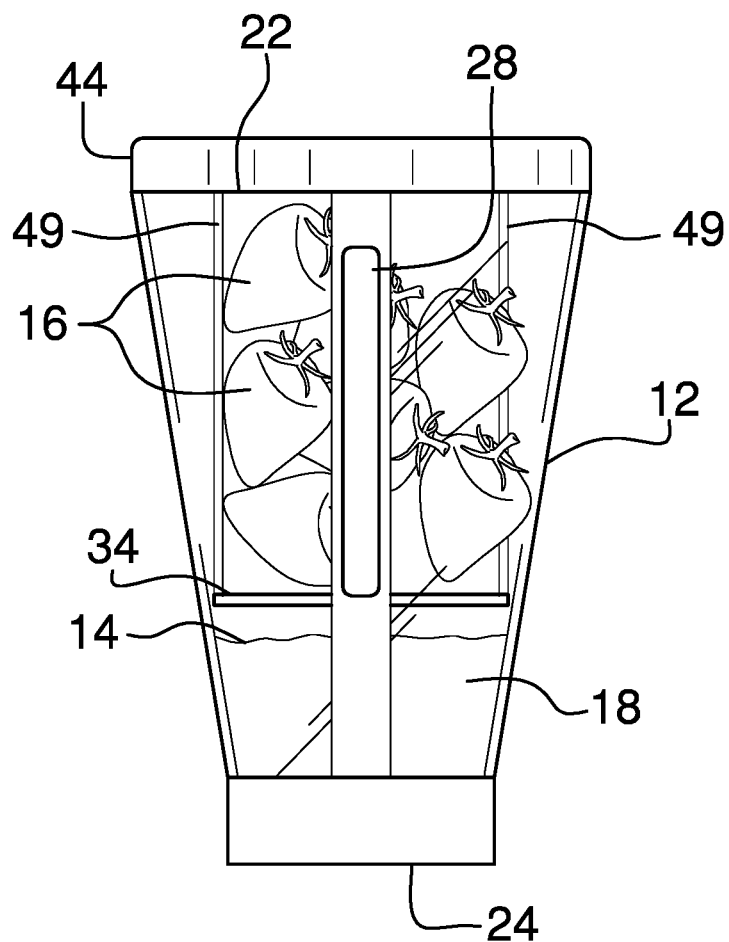
FIG. 3 is a back view of an embodiment of the disclosure.
Figure 4:
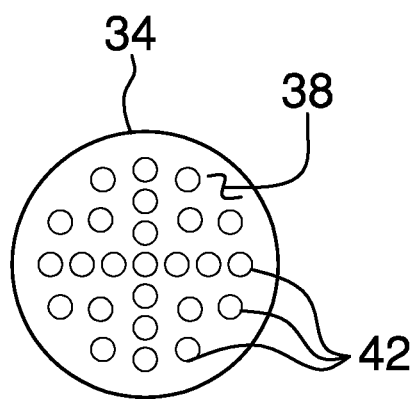
FIG. 4 is a top view of a strainer of an embodiment of the disclosure.

With reference now to the drawings, and in particular to FIGS. 1 through 4 thereof, a new washing device embodying the principles and concepts of an embodiment of the disclosure and generally designated by the reference numeral 10 will be described.

As best illustrated in FIGS. 1 through 4, the food washing assembly 10 generally comprises a container 12 for containing a fluid 14 and food items 16. The container 12 has an outer wall 18 and the outer wall 18 has a plurality of deformable sections 20 that is each squeezable inwardly on the outer wall 18. The container 12 is comprised of a fluid 14 impermeable material and the container 12 may be comprised of a translucent material. Additionally, the container 12 may have a fluid capacity ranging between approximately 16.0 fluid oz and 32.0 fluid oz.

The container 12 has a top end 22 and a bottom end 24, and the outer wall 18 extends therebetween. The top end 22 is open and each of the deformable sections 20 extends between the top 22 and bottom 24 ends. The outer wall 18 angles inwardly between the top 22 and bottom 24 ends such that the container 12 has a frustum shape. The outer wall 18 has an outer surface 26 and the outer surface 26 is threaded adjacent to the top end 22. A handle 28 is coupled to the container 12 for gripping. The handle 28 has a first end 30 and a second end 32, and each of the first 30 and second 32 ends is coupled to the outer wall 18 having the handle 28 curving outwardly from the outer wall 18. The bottom end 24 of the container 12 has a diameter that is sufficiently small to fit into cup holders found in vehicles or the like.

A strainer 34 is positionable in the container 12 to support the food items 16. Each of the deformable sections 20 is squeezed to frictionally engage the strainer 34 thereby retaining the strainer 34 at a selected point in the container 12. Moreover, the container 12 is agitated when the when the strainer 34 is positioned in the container 12 for washing the food items 16 with the fluid 14. In this way the food items 16, such as raw fruit or vegetables, can be washed prior to eating the food items 16. The fluid 14 may be water or any other non toxic cleaning solution that is suitable for human consumption.

The strainer 34 has a first surface 36, a second surface 38 and an outer edge 40 extending therebetween. The strainer 34 has a plurality of apertures 42 each extending through the first 36 and second 38 surfaces. Each of the apertures 42 facilitates the fluid 14 to pass through the strainer 34 for washing the food items 16. Each of the deformable sections 20 engages the outer edge 40 when the deformable sections 20 are squeezed inwardly. Moreover, each of the deformable sections 20 is biased away from a center of the container 12 such that deformable sections 20 disengage from the strainer 34 when the deformable sections 20 are not squeezed. Thus, the strainer 34 can be removed from the container 12 when the deformable sections 20 are not being squeezed. The strainer 34 has a diameter that is greater than a diameter of the bottom end 24 of the container 12. Thus, the strainer 34 is spaced upwardly from the bottom wall 24 of the container 12 when the strainer 34 is dropped into the container 12

A lid 44 is removably coupled to the container 12 for retaining the food items 16 and the fluid 14 in the container 12 for washing the food items 16 with the fluid 14. The lid 44 has an upper wall 46 and a perimeter wall 48 extending downwardly therefrom, and the perimeter wall 48 has an inwardly facing surface 50. The lid 44 is positionable on the first end 30 of the container 12 having the inwardly facing surface 50 threadably engaging the outer wall 18 of the container 12. A pair of stems 49 is each coupled to and extends upwardly from the first surface 36 of the strainer 34. Each of the stems 49 is aligned with the outer edge 40 of the strainer 34 and each of the stems 49 has a distal end 51 with respect to the strainer 34. The distal end 51 of each of the stems 49 abuts the lid 44 when the lid 44 is positioned on the container 12. Thus, the strainer 34 is inhibited from moving when the container 12 is inverted.

In use, the strainer 34 is positioned in the container 12 until the strainer 34 abuts the outer wall 18 of the container thereby spacing the strainer from the bottom end of the container. The fluid 14 is poured into the container 12 and the food items 16 are poured into the container 12; the food items 16 rest on top of the strainer 34 and the fluid 14 rests beneath strainer 34. The lid 44 is positioned on the container 12 and the container 12 is agitated while the deformable sections 20 are being squeezed. Thus, the fluid 14 flows back and forth through the strainer 34 to wash the food items 16. Additionally, the fluid 14 drains through the strainer 34 when the container 12 is positioned upright thereby facilitating the food items 16 to be consumed. In this way the food items 16 can be washed while driving in a vehicle. The lid 44 is removed and the food items 16 are removed from the container 12 for consumption.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A food washing assembly being configured to contain food items and a cleaning solution for cleaning the food items, said assembly comprising:
    a container for containing a fluid and food items, said container having an outer wall, said outer wall having a plurality of deformable sections each being squeezable inwardly on said outer wall;
    a strainer being positionable in said container wherein said strainer is configured to support the food items, each of said deformable sections being squeezed to frictionally engage said strainer thereby retaining said strainer at a selected point in said container, said container being agitated when said strainer is positioned in said container for washing the food items with the fluid, said strainer having a first surface, a second surface and an outer edge extending therebetween;
    a lid being removably coupled to said container for retaining the food items and the fluid in said container for washing the food items with the fluid; and
    a pair of stems, each of said stems being coupled to and extending upwardly from said first surface of said strainer, each of said stems having a distal end with respect to said first surface, said distal end of each of said stems abutting said lid when said strainer is positioned in said container and said lid is positioned on said container.

2. The assembly according to claim 1, wherein said container has a top end and a bottom end, said outer wall extending therebetween, said top end being open, each of said deformable sections extending between said top and bottom ends, said outer wall angling inwardly between said top and bottom ends such that said container has a frustum shape, said outer wall having an outer surface, said outer surface being threaded adjacent to said top end.

3. The assembly according to claim 2, wherein said strainer having a plurality of apertures each extending through said first and second surfaces, each of said deformable sections engaging said outer edge when said deformable sections are squeezed inwardly, each of said deformable sections being biased away from a center of said container such that deformable sections disengage from said strainer when said deformable sections are not squeezed.

4. The assembly according to claim 3, wherein said lid has an upper wall and a perimeter wall extending downwardly therefrom, said perimeter wall having an inwardly facing surface, said lid being positionable on said first end of said container having said inwardly facing surface threadably engaging said outer wall of said container.

5. A food washing assembly being configured to contain food items and a cleaning solution for cleaning the food items, said assembly comprising:
    a container for containing a fluid and food items, said container having an outer wall, said outer wall having a plurality of deformable sections each being squeezable inwardly on said outer wall, said container having a top end and a bottom end, said outer wall extending therebetween, said top end being open, each of said deformable sections extending between said top and bottom ends, said outer wall angling inwardly between said top and bottom ends such that said container has a frustum shape, said outer wall having an outer surface, said outer surface being threaded adjacent to said top end;
    a handle being coupled to said container for gripping, said handle having a first end and a second end, each of said first and second ends being coupled to said outer wall having said handle curving outwardly from said outer wall;
    a strainer being positionable in said container wherein said strainer is configured to support the food items, each of said deformable sections being squeezed to frictionally engage said strainer thereby retaining said strainer at a selected point in said container, said container being agitated when said strainer is positioned in said container for washing the food items with the fluid, said strainer having a first surface, a second surface and an outer edge extending therebetween, said strainer having a plurality of apertures each extending through said first and second surfaces, each of said deformable sections engaging said outer edge when said deformable sections are squeezed inwardly, each of said deformable sections being biased away from a center of said container such that deformable sections disengage from said strainer when said deformable sections are not squeezed;

a lid being removably coupled to said container for retaining the food items and the fluid in said container for washing the food items with the fluid, said lid having an upper wall and a perimeter wall extending downwardly therefrom, said perimeter wall having an inwardly facing surface, said lid being positionable on said first end of said container having said inwardly facing surface threadably engaging said outer wall of said container; and a pair of stems, each of said stems being coupled to and extending upwardly from said first surface of said strainer, each of said stems having a distal end with respect to said first surface, said distal end of each of said stems abutting said lid when said strainer is positioned in said container and said lid is positioned on said container.

\* \* \* \* \*